Patented Oct. 25, 1932

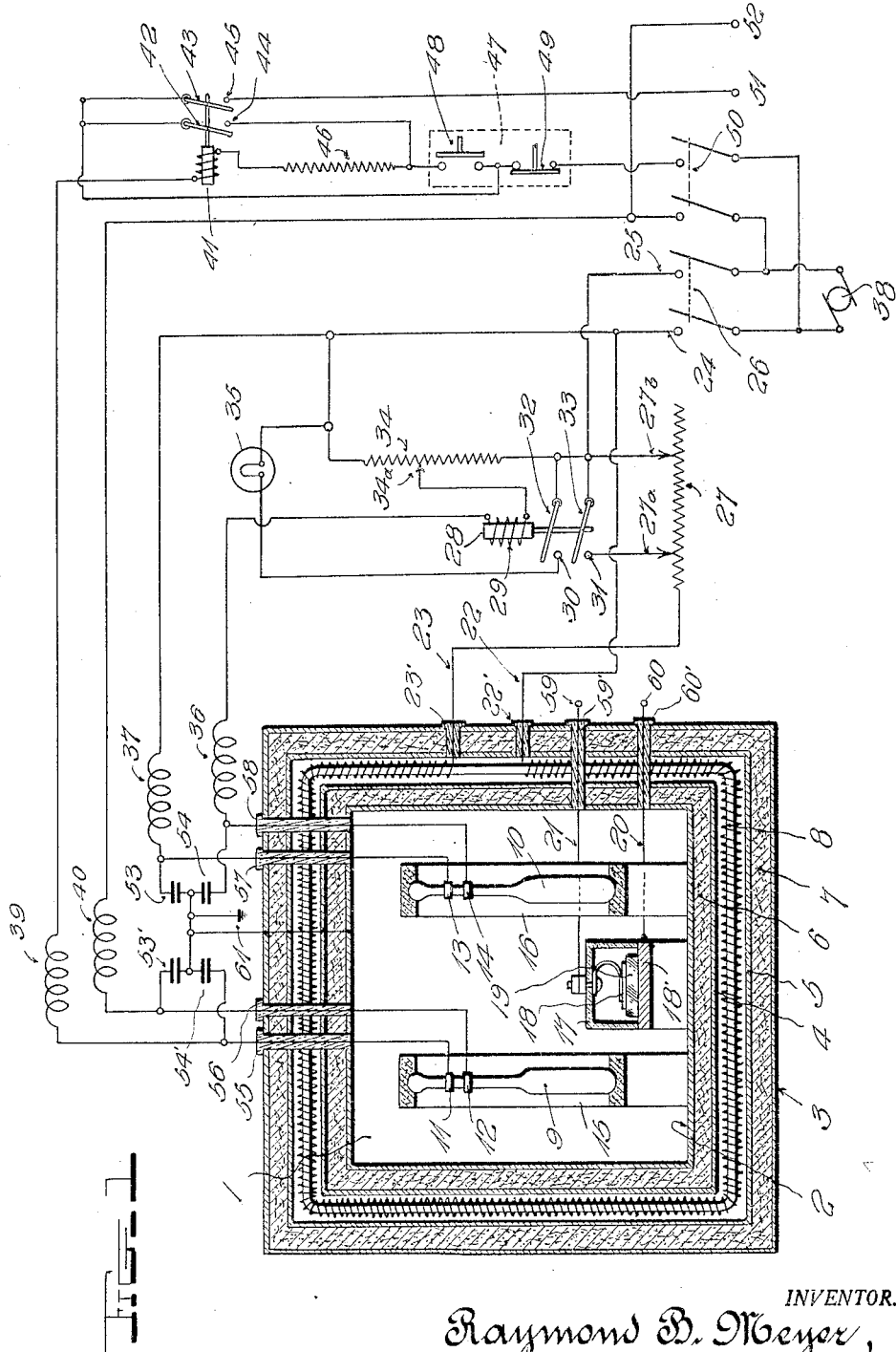

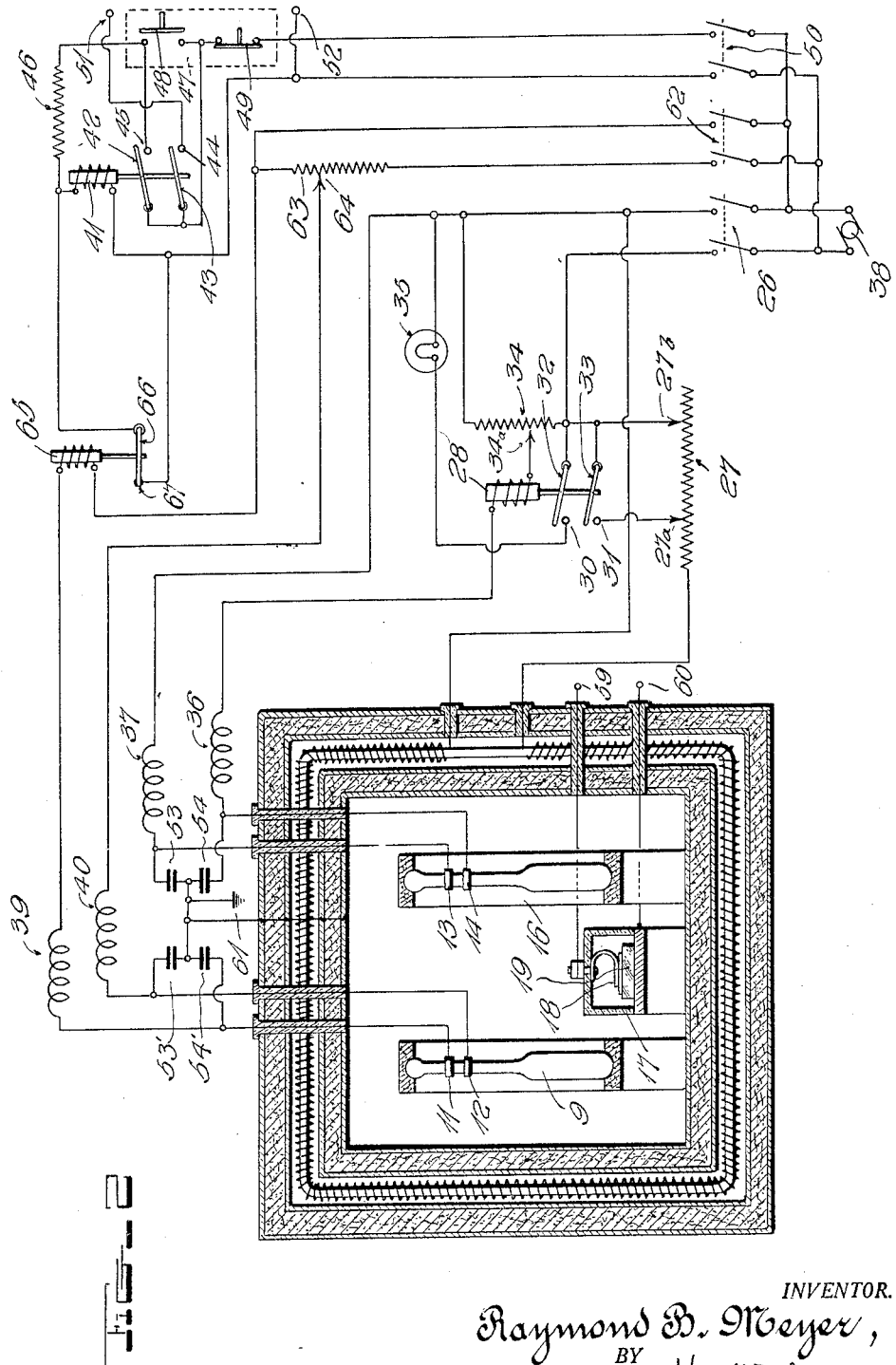

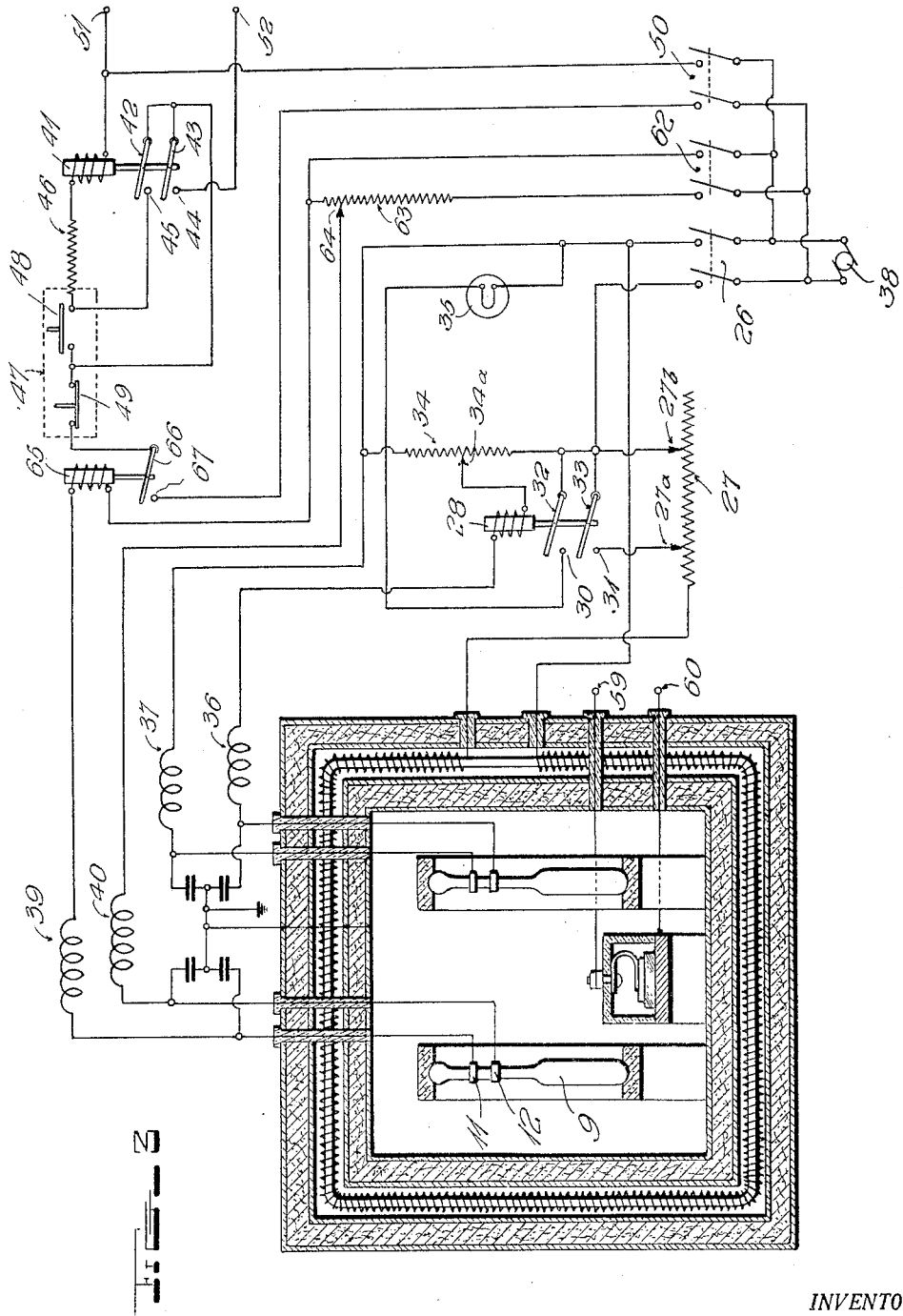

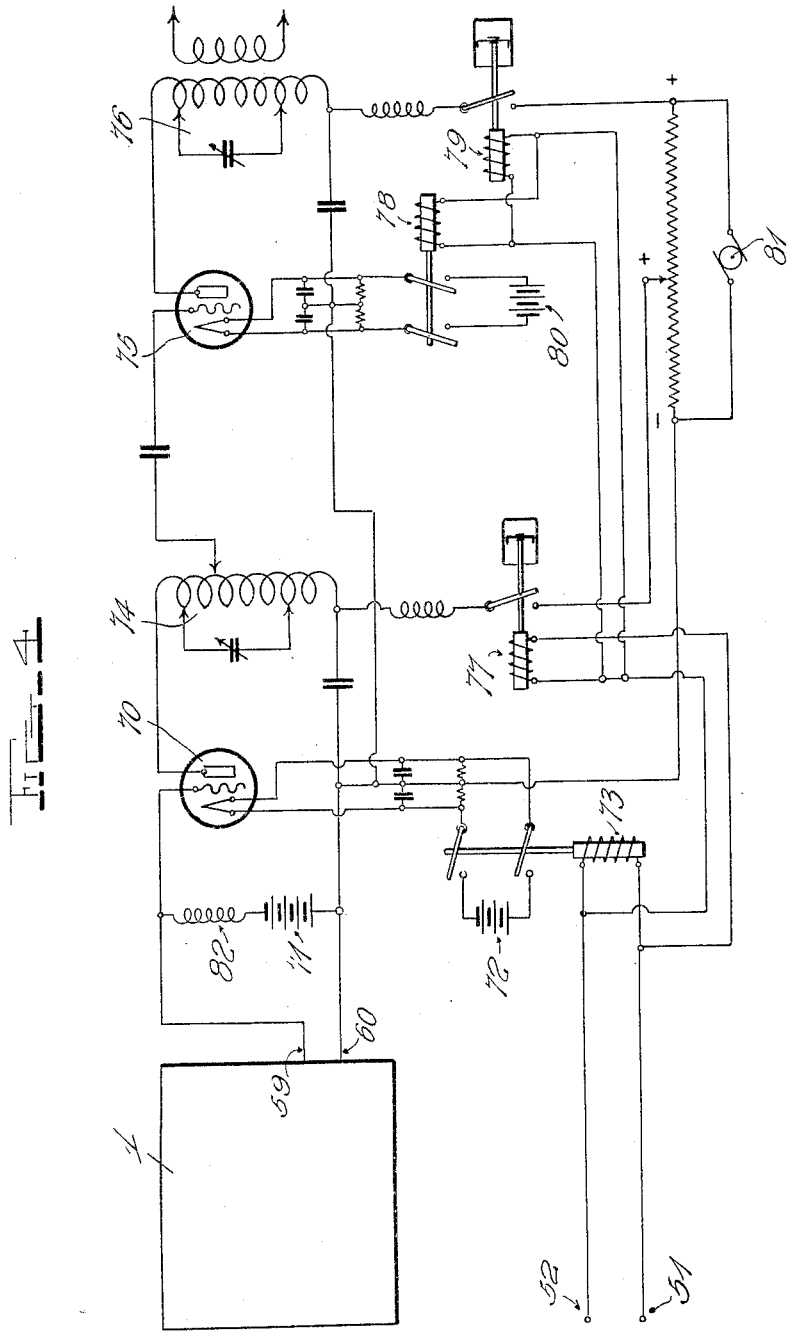

1,884,797

UNITED STATES PATENT OFFICE

RAYMOND B. MEYER, OF WASHINGTON, DISTRICT OF COLUMBIA

TEMPERATURE AND CIRCUIT CONTROL SYSTEM FOR HIGH FREQUENCY SIGNALING SYSTEMS

Application filed March 12, 1929. Serial No. 346,482.

My invention relates broadly to temperature control devices for signaling systems and more particularly to temperature control devices for signaling systems wherein circuit control devices are incorporated to prevent the operation of the signaling system until a predetermined temperature is obtained.

One of the objects of my invention is to provide an arrangement in a signaling system wherein an electromechanical vibrator is kept at a substantially uniform temperature and wherein certain circuits of the signaling system are rendered inoperative until a predetermined temperature is established in the medium surrounding the electromechanical vibrator.

Another object of my invention is to provide an arrangement in a signaling system wherein an electromechanical vibrator is kept at a substantially uniform temperature and wherein circuits of the signaling system are controlled by a thermally operated device kept at substantially the same temperature as the electromechanical device.

Still another object of my invention is to provide an arrangement in a signaling system wherein an electromechanical vibrator is housed within a temperature regulated compartment wherein a thermally operated device is located for controlling circuits of the signaling system in accordance with the temperature variations within the compartment.

Other and further objects of my invention will be more fully understood from the following specification by reference to the accompanying drawings, in which:

Figure 1 illustrates an embodiment of the invention; Fig. 2 illustrates a modified form of this invention; Fig. 3 illustrates a further modification; and Fig. 4 is a circuit arrangement.

In Fig. 1 of the drawings reference numeral 1 designates a heat retaining container having walls 2 and 3 of heat conducting material, such as copper, aluminum or similar materials, walls 4 and 5 of heat resisting material, such as mica, and walls 6 and 7, positioned between walls 2 and 4 and 3 and 5, respectively, of heat retaining material of a cellular texture, such as wood pulp composition or loosely packed wood fibers. A heating unit 8 is positioned between the heat resisting walls 4 and 5. Thermostats 9 and 10 preferably of the mercury expansion type having electrodes 11 and 12, and 13 and 14, respectively, are supported within the container by the members 15 and 16, respectively. These thermostats may be positioned within the wall 6 or adjacent to the heating unit 8 if desired.

A piezo electric element holder 17, of any conventional construction is positioned within the container for supporting the piezo electric element 19 in operative position. Connections 20 and 21 are provided to the contacting plates 18 and 18' of the holder 17. Connections 22 and 23 are provided between the heating unit 8 and the terminals 24 and 25 of the switch 26 which is connected to source of current supply 38. A resistance unit 27 is connected into circuit with the heating unit 8. The winding 29 of the relay 28 is connected to the electrode 14 of the thermostat 10 through the choke coil 36. A resistance unit 34 is connected across the terminals 24 and 25 of the switch 26. A tapped connection 34a is associated with the resistance 34 for varying the current to the winding of the relay 28. Armatures 32 and 33 which are adapted to engage the contacts 30 and 31, are actuated by the relay 29. A signaling device 35, such as a lamp or buzzer is connected to the contact 30 and the terminal 24. The electrode 13 of the thermostat 10 is connected to the terminal 24 of the switch 26 through the choke coil 37. The winding of the relay 29 is energized when the circuit between the electrodes 13 and 14 of the thermostat 10 is established and the armatures 32 and 33 are caused to disengage the contacts 30 and 31; the circuit of the signaling device 35 is thereby de-energized and the greater part of the resistance 27 between movable connection 27b and terminal connection 23 is connected into the circuit of the heating unit. When the circuit between the electrodes 13 and 14 is interrupted by virtue of the decrease in temperature in the container 1 the relay 29 is de-energized and the armatures 32 and 33 are caused to be released whereupon the circuit of the device 35 is energized and the resistance of the circuit of the heating unit 8 is decreased since the portion of resistance 27 between the movable connections 27a and 27b is short circuited.

The electrodes 11 and 12 of the thermostat 9 are connected to the choke coils 39 and 40. One terminal of the winding of the relay 41 is connected to the choke coil 39. The other terminal of the winding of the relay 41 is connected to the source of supply 38 through the switch 50, the resistance 46 and the momentary contact switch 47. The armatures 42 and 43 which are associated with the relay 41, engage the contacts 44 and 45, respectively, when the relay 41 is energized. The circuit between the electrodes 11 and 12 of thermostat 9 is established when the normal operating temperature is obtained within the container 1. The relay 41 is then energized through the actuation of the momentary contact 48 of the device 47 and the armatures 42 and 43 are caused to engage the contacts 44 and 45. The circuit between the terminals 51 and 52, which are connected to a relay system, which controls a source of anode energizing current supply for the anode circuit of an electron discharge device associated with the piezo electric element 19, is completed when the relay 41 causes the armatures 42 and 43, associated therewith, to engage the contacts 44 and 45.

In operation the switches 26 and 50 are closed and the source of current supply 38 is caused to energize the heating unit 8. The temperature within the container 1 rises to a predetermined value and the circuits of the thermostats 9 and 10 are closed. The winding 29 of relay 28 is energized and the armatures 32 and 33 are caused to disengage the contacts 30 and 31 whereupon the signal 35 is disconnected from its source of supply 38 and an additional portion of the resistance 27 is connected in series with the heating unit 8.

After the circuit through the thermostat 9 is complete the circuit controlled by the relay 41 may then be established by actuating the switch 48 of the device 47. The circuit controlled by the relay 41 can not, however, be energized by actuating the switch 48 until after the circuit within the thermostat 9 is completed. The switch 49 of the momentary contact device 47 serves to interrupt the circuit of the relay 41. The choke coils 36, 37, 39 and 40 are provided to prevent excessive high frequency currents from entering the thermostats 9 and 10. Condensers 52' and 54' are connected in series across the electrodes of thermostat 9 to provide a low impedance path to a ground connection 61 for any high frequency current that is transmitted to the electrodes of the thermostat. Condensers 53 and 54 are connected across the electrodes 13 and 14 of the thermostat 10. The common connection of the condensers 53 and 54 is likewise grounded together with the metallic walls 2 and 3 of the container 1 as indicated at 61. Bushings 22', 23', 55, 56, 57, 58, 59' and 60', of insulating material, such as porcelain are provided in the walls of the container 1 for the conductors leading to the heating unit, the thermostats and piezo electric element, respectively.

In Fig. 2 of the drawings, an arrangement is shown wherein a relay 65, having an armature 66 adapted for engaging the contact 67, is connected to the thermostat 9 and to the source 38 through the switch 62 and the current limiting resistance 63, for normally short circuiting the winding of the relay 41 until the circuit through the thermostat 9 is completed and the relay 65 energized so that the armature 66 is caused to disengage the contact 67.

The relay 41 is thus rendered inoperative until the relay 65 is energized and the armature 66 is caused to disengage the contact 67; this condition prevails when the temperature within the container 1 is increased to such degree that the circuit through the thermostat 9 is completed. The resistance unit 63 is connected across the source of supply 38. A tapped connection 64 is associated with the resistance unit 63 for varying the voltage impressed across the thermostat 9 and the relay 65. The relay 65 is preferably a sensitive relay requiring a current of small magnitude to operate it.

In Fig. 3 an arrangement is illustrated wherein the armature 66 and contact 67 of the relay 65 are connected into the circuit of switch 49 of the momentary contact switch 47. When the temperature within the container rises sufficiently to cause the circuit of the thermostat 9 to be completed between the electrodes 11 and 12 the relay 65 is energized and the circuit between the contact 67 and the armature 66 is completed and the circuit of the relay 41 may then be energized by actuating the switch 48 of the momentary contact switch 47. A current limiting resistance 46 is connected in series with the winding of the relay 41.

In Fig. 4 the circuit arrangement of a high frequency oscillation generating and amplifying system, such as is adapted to be employed in conjunction with and controlled by the arrangements illustrated in Figs. 1, 2 and 3, is shown. The connections 59 and 60 of the electro-mechanical vibrator 19, which is positioned in the container 1, are connected to the grid electrode and the cathode of the electron discharge device 70.

A source of supply 72 is associated with the cathode of device 70. An oscillatory circuit 74 is connected to the anode of the device 70. The grid electrode of discharge device 75 is coupled to the output circuit of the device 70. A source of supply 80 is associated with the cathode of the device 75. An oscillatory circuit 76 is connected to the anode of the device 75. A source of current supply 81 for the anode circuits of the electron discharge devices 70 and 75 is connected to the time delay relays 77 and 79 which are connected to the anode circuits of the electron discharge devices 70 and 75, respectively. Connections are made between the terminals 51' and 52' of the arrangement illustrated in Fig. 4 and the terminals 51 and 52, respectively, of any one of the arrangements illustrated in Figs. 1, 2 and 3. The circuits of the electron discharge devices 70 and 75 can not normally be energized until the thermostat 9, which is positioned in container 1, has completed the circuit between the electrodes 11 and 12 associated with it. After the circuit within the thermostat 9 is completed the circuits of the relays 73, 77, 78 and 79 are completed by actuating the switch 48 of the momentary contact 47. When it is desired to de-energize the relays 73, 77, 78 and 79 the switch 49 is actuated. The time delay relays 77 and 79 are arranged to close the circuits of the anode source of supply after the relays 73 and 78 have established the circuit between the cathodes of devices 70 and 75 and their respective sources of supply and sufficient time has elapsed for the cathodes to reach operating temperature.

My invention is adapted for use with any type of frequency stabilizing or governing element, such as, the piezo electric element type and the magnetostriction type, in which the frequency varies with the changes in temperature. While I have described my invention in several of its preferred embodiments, I desire that it be understood that other modifications may be made and that no limitations on my invention are intended other than are imposed by the scope of the appended claims.

What I claim as new and desire to secure by Letters Patent of the United States is as follows:

1. A temperature control system for an oscillator system comprising a container, an electromechanical vibrator element whose natural frequency varies with temperature disposed within said container, a plurality of thermostats positioned within said container, a heating unit adjacent said container, an electron tube having anode, control grid and cathode circuits connected therewith, power supply means for said circuits, connections between one of said thermostats and said heating unit and connections between another of said thermostats and said power supply means and the circuits of said electron tube for rendering said electron tube operative when said electromechanical vibrator element is elevated to a predetermined temperature and maintaining the temperature of said electromechanical vibrator constant for controlling the operation of said electron tube at constant frequency.

2. A temperature control system for an oscillator system comprising a container, an electromechanical vibrator element whose natural frequency varies with temperature disposed within said container, a plurality of thermostats positioned within said container, a heating unit adjacent said container, a plurality of electron tubes each having anode and cathode circuits, power supply means for said circuits, means controlled by one of said thermostats for preconditioning the operation of said electron tubes by establishing connections between said circuits and said power supply means when said electromechanical vibrator is elevated to a predetermined temperature, and means controlled by another of said thermostats for controlling the energization of said heating unit for maintaining said electromechanical vibrator at constant temperature for governing the operation of said electron tubes at constant frequency.

3. A temperature control system for an oscillator system comprising a container, an electromechanical vibrator element whose natural frequency varies with temperature disposed within said container, a pair of thermostats disposed within said container and symmetrically arranged with respect to said electromechanical vibrator element, separate control circuits connected with said thermostats, an electron tube system having anode and cathode circuits, power supply means for said circuits, relays for connecting or disconnecting said power supply means with said anode and cathode circuits, control circuits interconnecting one of said thermostats with said relays, a heating unit adjacent said container, a power source for said heating unit, a relay for controlling the connections between said power source and said heating unit, said anode and cathode circuits being energized when said electromechanical vibrator is raised to a predetermined temperature, the temperature of said electromechanical vibrator being maintained constant under control of said second mentioned thermostat for governing the operation of said electron tube system from said electromechanical vibrator at constant frequency.

4. In a system of the class described the combination of a heat retaining container, an electromechanical vibrator whose natural frequency varies with temperature positioned within said container, a heating unit in thermal relation with said container for maintaining a predetermined temperature therein, a plurality of thermostats in thermal relation with said container, an electron discharge device, said electromechanical vibrator being connected into the circuits of an electron discharge device for controlling the frequency of oscillation thereof, one of said thermostats being arranged to govern the operation of said heating unit, and another of said thermostats being arranged to control the operation of said electron discharge device whereby the circuits of said electron discharge device are rendered inoperative until the circuit through said last mentioned thermostat is established.

5. In a system of the class described the combination of a heat retaining container, an electromechanical vibrator whose natural frequency varies with temperature positioned in said container, a heating unit in thermal relation with said container, a plurality of thermostats in thermal relation with said container, one of said thermostats being connected for controlling the operation of said heating unit, control circuits in electrical relation with sources of current supply for a high frequency signaling system, another one of said thermostats being arranged to control the operation of said control circuits, said electromechanical vibrator being connected for controlling said control circuit, and choke coils connected into the circuits of said thermostats for substantially preventing high frequency energy from being impressed upon the circuits of said thermostats.

6. In a system of the class described the combination of a container, an electromechanical vibrator whose natural frequency varies with temperature positioned in said container, means for obtaining a predetermined temperature within said container, a plurality of thermostats in thermal relation with said container, an electron discharge device, said electromechanical vibrator being in electrical relation with circuits of said electron discharge device for controlling the frequency of oscillation thereof, said electron discharge device having sources of current supply connected therewith, and a relay circuit connected to electrodes of one of said thermostats, said relay circuit being arranged to control the circuits of at least one of the sources of current supply connected with said electron discharge device.

7. In a system of the class described the combination of a container having a plurality of heat retaining walls, a heating unit positioned between adjacent ones of said heat retaining walls, a plurality of thermostats positioned in said container, an electro-mechanical vibrator whose natural frequency varies with the temperature, a high frequency oscillation generator, connections between said electro-mechanical vibrator and said high frequency oscillation generator, means for energizing the circuits of said high frequency oscillation generator, and means in electrical relation with one of said thermostats operable in accordance with the operation of said thermostat, said second mentioned means being in electrical relation with said first named means.

8. In a system of the class described the combination of a container, an electromechanical vibrator whose natural frequency varies with temperature positioned in said container, means for obtaining a predetermined temperature within said container, a high frequency oscillation generator connected to said electromechanical vibrator, a plurality of thermostats positioned within said container, relays connected to said thermostats, one of said relays being arranged to control the operation of circuits of said high frequency oscillation generator.

9. In a system of the class described the combination of a container, means for heating said container, an electromechanical vibrator whose natural frequency varies with temperature positioned in said container, a high frequency oscillation generator, said electromechanical vibrator being in electrical relation with circuits of said high frequency oscillation generator for controlling the frequency of the oscillations generated, and means in thermal relation with said container to render the circuits of said high frequency generator inoperative until a predetermined temperature is obtained within said container.

10. In a system of the class described the combination of a container, means for heating said container, an electromechanical vibrator whose natural frequency varies with temperature positioned in said container, a high frequency oscillation generator, connections between said electromechanical vibrator and said high frequency oscillation generator, means connected with said high frequency oscillation generator for energizing the circuits thereof, thermally operated means in thermal relation with said container, the operation of said second named means being governed by said thermally operated means.

11. In a control system for an oscillation generator, a heat retaining container, a piezo electric crystal whose natural frequency of vibration varies with temperature being positioned in said container, a pair of thermostats in thermal relation with said container, means for heating said container adapted to be controlled by one of said thermostats, an electron tube oscillation generator having its input circuit connected to said crystal, means whereby the other of said thermostats controls the operation of said oscillation generator whereby said oscillation generator operates only when said crystal is at a temperature corresponding to a desired predetermined frequency.

12. In a system for generating high frequency oscillations of predetermined frequency, an electron tube generator, power supply circuits for said electron tube generator, a piezo electric crystal whose natural frequency varies with temperature connected to the input circuit of said electron tube generator, temperature control means adjacent said crystal, means for preconditioning the operation of said generator by establishing connections between the power supply circuits and the circuits of said generator when said crystal is elevated to a predetermined temperature, and separate means adjacent said crystal for maintaining said crystal at said predetermined temperature.

13. In a system for generating high frequency oscillations of predetermined frequency, an electron tube generator, a piezo electric crystal whose natural frequency varies with temperature connected to the input circuit of said electron tube generator, an electrical thermostat adjacent said piezo electric crystal and adapted to be actuated by the temperature of said crystal, and means for causing said generator to deliver oscillations only when said thermostat registers a predetermined temperature, said means consisting of circuits and relays connecting said thermostat to the control circuits of said electron tube generator.

14. In a system for generating high frequency oscillations of predetermined frequency, an electron tube generator, a piezo electric crystal whose natural frequency varies with temperature connected to the input circuit of said electron tube generator, a heat retaining container enclosing said piezo electric crystal, an electrical thermostat in said container, and means for causing said generator to deliver oscillations only when said thermostat registers a predetermined temperature, said means consisting of circuits and relays connecting said thermostat to the control circuits of said electron tube generator.

15. In a system for generating high frequency oscillations of predetermined frequency, an electron tube generator, a piezo electric crystal whose natural frequency varies with temperature connected to the input circuit of said electron tube generator, a heat retaining container enclosing said piezo electric crystal, an electrical thermostat in said container, means for causing said generator to deliver oscillations only when said thermostat registers a predetermined temperature, means for maintaining said container at a predtermined temeperature, said last mentioned means comprising a source of heat in said container, a heater thermostat in said container, and means whereby said heater thermostat controls the operation of said source of heat.

RAYMOND B. MEYER.